United States Patent
Enright et al.

(12) 
(10) Patent No.: US 6,399,701 B1
(45) Date of Patent: Jun. 4, 2002

(54) SURFACTANT-FREE SEMI-CONTINUOUS EMULSION POLYMERIZATION PROCESS FOR MAKING SUBMICRON SIZED PARTICLES FOR CARRIER COATINGS

(75) Inventors: Thomas E. Enright, Tottenham; Anthony James Paine; George Liebermann, both of Mississauga, all of (CA); Kenneth Derek Henderson, Rochester; Scott M. Silence, Fairport, both of NY (US); Bernard A. Kelly, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/570,724

(22) Filed: May 15, 2000

(51) Int. Cl.⁷ ............................ C08L 31/02; C08L 31/06
(52) U.S. Cl. ....................... 524/832; 524/836; 524/779; 526/317.1; 526/319
(58) Field of Search .................................. 524/832, 836, 524/779; 526/317.1, 319, 328, 335, 346

(56) References Cited

U.S. PATENT DOCUMENTS

| | | | |
|---|---|---|---|
| 3,847,604 A | | 11/1974 | Hagenbach et al. |
| 4,935,326 A | | 6/1990 | Creatura et al. |
| 4,935,469 A | | 6/1990 | Akasaki et al. |
| 4,937,166 A | | 6/1990 | Creatura et al. |
| 5,219,943 A | | 6/1993 | Akasaki et al. |
| 5,447,791 A | * | 9/1995 | Cunningham et al. ...... 428/327 |
| 5,455,315 A | | 10/1995 | Paine et al. |
| 5,529,719 A | * | 6/1996 | Cunningham et al. ...... 252/511 |
| 5,679,724 A | | 10/1997 | Sacripante et al. |
| 5,902,853 A | | 5/1999 | Paine et al. |
| 6,093,770 A | * | 1/2000 | Enright et al. .............. 524/779 |
| 6,132,918 A | * | 10/2000 | Enright ....................... 430/108 |

OTHER PUBLICATIONS

Ting–Chung Pan et al., "The Effect of Sodium Methacrylate on the Soapless Emulsion Copolymerization of Methyl Methacrylate and n–Butyl Acrylate", Journal of Polymer Science: Part A: Polymer Chemistry, vol. 29, pp. 709–718 (1991).

Chorng–Shyan Chern et al., "Semibatch Surfactant–Free Emulsion Polymerization of Butyl Acrylate in the Presence of Carboxylic Monomers", Polymer Journal, vol. 28, No. 4, pp. 343–351 (1996).

I. W. Cheong et al., "Effects of Surface Charge Density on Emulsion Kinetics and Secondary Particle Formation in Emulsifier–Free Seeded Emulsion Polymerization of Methyl Methacrylate", Colloid Polym Sci 275. Pp. 736–743 (1997).

* cited by examiner

*Primary Examiner*—David W. Wu
*Assistant Examiner*—Tatyana Zalukaewa
(74) *Attorney, Agent, or Firm*—Oliff & Berridge, PLC; Eugene O. Palazzo

(57) ABSTRACT

Submicron sized particles of poly(methyl methacrylate) are prepared by a surfactant-free semi-continuous emulsion polymerization process that involves (i) preparing an aqueous phase containing a free radical initiator in water by heating and stirring, (ii) preparing a monomer composition containing at least 80% by weight methyl methacrylate and 1 to 10% by weight of a crosslinking agent, (iii) adding the monomer composition to the aqueous phase to initiate emulsion polymerization of the monomer composition, the adding being done at a rate such that from 0.05% to 5% by weight of the total weight of the monomer composition is added per minute, (iv) continuing heating and stirring following completion of the adding of the monomer composition for an amount of time, and (v) drying and recovering the submicron sized particles of poly(methyl methacrylate). The submicron sized particles of poly(methyl methacrylate are used in forming a coating of carrier particles for a two-component developer composition.

16 Claims, No Drawings

SURFACTANT-FREE SEMI-CONTINUOUS EMULSION POLYMERIZATION PROCESS FOR MAKING SUBMICRON SIZED PARTICLES FOR CARRIER COATINGS

BACKGROUND OF THE INVENTION

1. Field of the Invention

The invention relates to a surfactant-free semi-continuous emulsion polymerization process for making submicron sized particles containing poly(methyl methacrylate) (PMMA), and to a method of preparing carrier particles coated with a coating containing the submicron sized particles. The aforementioned coated carrier particles are especially useful, in conjunction with toner particles, in forming developer compositions to be used in imaging processes, especially xerographic processes.

2. Description of Related Art

Various methods are known for directly preparing resin particles from monomers, including dispersion polymerization, encapsulation, emulsion polymerization, and emulsion-aggregation.

U.S. Pat. No. 5,902,853 describes a process for the preparation of resin particles comprising adding a mixture of at least one free radical reactive monomer continuously to a heated aqueous solution of a water soluble free radical initiator and a water soluble salt to form latex emulsion particles and aggregates thereof, wherein the rate of continuous addition of the monomer is greater than the rate at which monomer is consumed by polymerization. By this process, monomer polymerization and particle aggregation can be achieved simultaneously under controlled monomer excess feed or "flood" feed conditions to provide monodisperse resin particles and resin particle aggregates thereof with a volume average diameter size range of, for example, from about 1 to about 10 micrometers. The composition and processes are described to enable emulsifier free emulsion polymerization processes achieving monodisperse resin particles or resin particle aggregates within an average diameter size range of, for example, from about 1 to about 3 micrometers and geometric particle size distributions below about 1.05, for example, of from about 1.01 to about 1.02. The resin particles and particle aggregates which are described to be suitable for use in dry and liquid developers and toner for printing applications.

U.S. Pat. No. 5,455,315 describes an in situ process for the preparation of resin particles comprising preparing a seed particle latex by aqueous emulsion polymerization of a first mixture comprised of at least one monomer, an optional chain transfer agent, and a water soluble free radical initiator, wherein the reaction of the free radical initiator and monomer produces oligomeric radicals which provide in situ stabilization to the resulting first generation seed particles; optionally diluting the first seed particle latex with water; heating and starve feed adding to the first generation seed particles a second mixture comprised of at least one monomer, an organic soluble free radical initiator, an optional chain transfer agent, an optional water soluble free radical initiator, and an optional surfactant to form a third mixture comprised of second generation seed particles; heating and starve feed adding to the second generation seed particles additional said second mixture to form a fourth mixture comprised of third generation seed particles; heating and starve feed adding to the third generation seed particles additional said second mixture to form a fifth mixture comprised of fourth generation seed particles; and heating and starve feed adding to the fourth generation seed particles additional said second mixture to form a sixth mixture comprised of fifth generation seed particles.

U.S. Pat. No. 5,679,724 describes submicron particles for ink jet inks. In particular, the patent describes an ink for ink jet printing to include an emulsifiable polymer resin and a pigment, and made by (a) combining (1) an emulsion of an emulsifiable polymer resin in an anionic medium with (2) a pigment and a cationic surfactant, and (b) aggregating particles in the mixture of step (a) to a desired particle size, thereby producing a solution of aggregated particles. The particles can optionally be coalesced to alter the particle size of the particles.

U.S. Pat. Nos. 5,219,943 and 4,935,469 both disclose processes for producing monodispersed fine particles of a vinyl polymer comprising polymerizing monomers containing at least one vinyl monomer, and a methacrylic ester in the presence of a surface active agent, a persulfate polymerization initiator, and a divalent metal as an electrolyte. Monodispersed vinyl polymer fine particles having a particle size of one micrometer or greater with a very narrow size distribution can be obtained.

The aforementioned U.S. Pat. Nos. 5,219,943 and 4,935,469 are typical in describing known emulsion polymerization processes. In these processes, surface active agents (also known as surfactants or emulsifiers) are used to stabilize the emulsion during emulsion polymerization. The presence of surfactants is usually important for stabilizing the emulsion polymerization process. Generally, the surfactants include both ionic and nonionic surfactants. However, the same surfactants that contribute advantage in the emulsion polymerization step can be detrimental to the functional properties or processing of the final particles.

As a result, surfactants used in emulsion aggregation emulsion polymerization processes should be removed from the particle by washing. However, the removal of these surfactants from the emulsion aggregation particles is very tedious and resource consuming.

What is still desired is an efficient manner of producing submicron sized poly(methyl methacrylate) particles which find particular utility as components of a coating for carrier particles of a two-component developer.

SUMMARY OF THE INVENTION

The present invention is directed to a method for preparing small sized poly(methyl methacrylate) (PMMA) polymer and copolymer particles by a surfactant-free semi-continuous emulsion polymerization process.

In the process, submicron sized particles comprised of poly(methyl methacrylate) are prepared by (i) preparing an aqueous phase containing a free radical initiator in water by heating and stirring, (ii) preparing a monomer composition comprising at least 80% by weight methyl methacrylate, (iii) adding the monomer composition to the aqueous phase to initiate emulsion polymerization of the monomer composition, the adding being done at a rate such that from 0.05% to 5% by weight of the total weight of the monomer composition is added per minute, (iv) continuing heating and stirring following completion of the adding of the monomer composition for an amount of time, and (v) drying and recovering the submicron sized particles comprised of poly(methyl methacrylate), wherein the process is conducted in the absence of any surfactants.

The present invention is further directed to a process of making coated carrier particles by a powder coating process, in which the coating contains the small sized poly(methyl methacrylate) (PMMA) polymer and copolymer particles made by the surfactant-free semi-continuous emulsion polymerization process.

In this process, the submicron sized particles comprised of poly(methyl methacrylate) are first prepared as above. Then, following preparation of the submicron sized particles comprised of poly(methyl methacrylate), the coated carrier particles are prepared by (i) mixing a carrier core with a coating composition comprising the submicron sized particles comprised of poly(methyl methacrylate) for a time until the coating composition adheres to the carrier core, and (ii) heating the mixture for a time sufficient to melt and fuse the coating composition to the carrier core, thereby obtaining the coated carrier particle.

DETAILED DESCRIPTION OF PREFERRED EMBODIMENTS

The invention is particularly drawn to the formation of small sized particles, i.e., submicron sized particles having an average size of less than 1 µm, comprised of PMMA polymer or PMMA copolymers. For PMMA copolymers, the methyl methacrylate (MMA) monomer should comprise at least 80%, preferably at least 90%, more preferably at least 95%, and most preferably at least 99%, by weight of the monomer composition used to form the copolymer. As used herein, monomer composition refers to the material added to the reaction vessel that contains at least the MMA monomer, and thus includes MMA alone or MMA mixed with comonomers and any other optional ingredients.

Any monomer capable of forming a copolymer with MMA may be selected as the comonomer. Comonomers particularly useful in the surfactant-free process of the present invention include, but are not limited to, acrylic and methacrylic esters, styrene, vinyl esters of aliphatic acids, ethylenically unsaturated carboxylic acids, monomers containing amine groups, crosslinking agents, etc. More than one comonomer may be used.

Most preferably, the monomer composition contains MMA and only a crosslinking agent as the comonomer. The crosslinking agent may be, for example divinylbenzene, divinyltoluene, diacrylates, dimethylacrylates, and the like, most preferably divinylbenzene (DVB), and is present in relation to the MMA in an amount of from, for example, 1 to 10% by weight, preferably 3% by weight or less, most preferably 1% by weight or less, of the MMA/DVB total weight.

In the process, water, preferably deionized water, is added to a reaction vessel capable of mixing materials therein so that it can form the particles by emulsion polymerization. For example, the reaction vessel may be a vessel with an agitator having one or multiple impellers, a vessel containing a high speed agitator, such as a homogenizer, or a vessel equipped with an external loop containing an in-line mixing device. The mixing speed required to form the particles by emulsion polymerization is determined by the type of device used, and is readily determinable by practitioners in the art. For example, with a reaction vessel containing an agitator, the stirring is preferably conducted at, for example, 60 to 300 rpm, more preferably 100 to 200 rpm.

The amount of water initially charged to the reaction vessel is not critical, but is preferably at least twice the amount of monomers to be used in making the submicron sized particles on a weight basis.

The initial charge of water is heated while stirring. The heating continues until the water reaches a desired temperature below the boiling point of the water. For example, the water may be heated to a temperature of from 40° C. to 95° C., preferably of from 60° C. to 90° C.

Once the initial charge of water of the aqueous phase has reached the desired temperature, an initiator is then added to the water in the reaction vessel while stirring is continued. The initiator will act as the stabilizer for the latex particles formed upon addition of the monomer composition to the reaction vessel. The use of the initiator thus eliminates the need for the use of any surfactants. As such, the process is surfactant-free in that it contains no surface active agents, for example, soaps, typically used in emulsion polymerization, and thereby is more economical in that the polymer particles obtained do not need to undergo expensive and time-consuming washing operations following emulsion polymerization.

The initiator may be added directly to the reaction vessel, but is preferably added to the reaction vessel as a solution in water, most preferably deionized water. While in some cases it may be possible to include the initiator with the monomer composition, the initiator is most preferably completely added to the reaction vessel in advance of any of the monomer composition being added to the reaction vessel. The initiator is added in an amount of from, for example, 0.1% to 10% by weight, preferably 0.5% to 5% by weight, of the total amount of MMA monomer to be added to the reaction vessel. When the initiator is added in advance of the monomer composition, the heated water containing the initiator is stirred for an amount of time prior to addition of the monomer composition to the reaction vessel to insure that the initiator is evenly distributed within the water, for example for a time of 1 to 15 minutes.

The polymerization initiator is a free radical initiator and may or may not be a free radical initiator that attaches to the polymer forming ionic, hydrophilic end groups on the polymer. The presence of these ionic, hydrophilic end groups on the polymer may serve to stabilize the latex. The stability results from the electrostatic repulsion of the charged groups on a given latex particle with respect to those on the other particles. Suitable initiators include, but are not limited to, ammonium persulfate, potassium persulfate, sodium persulfate, ammonium persulfite, potassium persulfite, sodium persulfite, ammonium bisulfate, sodium bisulfate, 1,1'-azobis(1-methylbutyronitrile-3-sodium sulfonate), and 4,4'-azobis(4-cyanovaleric acid). Preferably, the initiator is a persulfate initiator such as ammonium persulfate, potassium persulfate, sodium persulfate and the like.

In addition, a chain transfer agent may be added either by adding directly to the reaction vessel or by including the chain transfer agent in the monomer composition. The chain transfer agent functions to control the molecular weight properties of the polymer to be formed. Chain transfer agents that may be used in the present invention include, but are not limited to, dodecanethiol, butanethiol, isooctyl-3-mercaptopropionate (IOMP), 2-methyl-5-t-butylthiophenol, carbon tetrachloride, carbon tetrabromide, and the like. Chain transfer agents may be used in any effective amount, such as from about 0.1 to about 10 percent by weight of the MMA monomer to be added to the reaction vessel.

The monomer composition is formed by mixing the MMA monomer and any other materials to be included with the MMA, for example comonomer(s), initiator, chain transfer agent, etc.

Once the water in the reaction vessel is ready for monomer addition to begin, i.e., the water in the reaction vessel is at the desired temperature and any added initiator has been sufficiently stirred in the water, addition of the monomer composition to the reaction vessel commences.

The process is a semi-continuous process in that the monomer composition is added over time into the reaction vessel instead of all at once or instead of being initially charged into the reaction vessel. In the process, it is not required to form seed particles from a portion of the monomer composition, and such is preferably not done. By using a semi-continuous process, a higher solids loading can be achieved compared to batch polymerization processes. In surfactant-free batch polymerization processes, typical solids loadings are less than 10% by weight because higher loadings cause particle aggregation. However, the semi-continuous process allows at least 40% by weight solids. This significantly improves reactor throughput and productivity.

The rate of addition of the monomer composition into the reaction vessel must be sufficiently slow so that the stability of the emulsion is not lost. If addition is too rapid, the emulsion becomes unstable and a gel results. The rate of addition of the monomer composition into the reaction vessel is, for example, from 0.05% to 5% by weight, preferably from 0.05% to 3% by weight, most preferably from 0.1% to 1.5% by weight, of the total weight of the monomer composition per minute. Uniform speed stirring is preferably maintained throughout the addition of the monomer composition to the reaction vessel, and the temperature of the materials within the reaction vessel is also preferably kept substantially constant.

In order to maintain the stability of the emulsion and latex particles formed, the most significant factors are initiator concentration and monomer composition flow rate. If the initiator concentration is too low or the monomer composition flow rate is too high, particle aggregation may occur. Balancing these properties within the above-discussed parameters is thus recommended in order to achieve the correct particle size for carrier coating applications.

After all of the monomer composition is added to the reaction vessel, stirring of the materials should be continued for a time sufficient to complete the polymerization of the MMA. For example, stirring may be continued for from 30 minutes to 4 hours.

The materials in the reaction vessel are then cooled, and the submicron PMMA particles obtained are dried and recovered by any suitable technique. The particles may be dried and recovered by, for example, vacuum drying, freeze drying or spray drying.

The PMMA particles obtained by the surfactant-free, semi-continuous emulsion polymerization process are submicron sized, meaning that on average, the particles have a size less than 1 micron in diameter. Preferably, the particles have a dry particle volume median diameter of from, for example, 0.1 to less than 1.0 micron, more preferably from 0.2 to 0.7 microns, and a number median diameter of from, for example, 0.1 to less than 1 micron, more preferably from 0.2 to 0.7 microns. The PMMA particles also preferably have a glass transition temperature of from, for example, 100° C. to 120° C.

In embodiments, the present invention is also directed to processes for the preparation of coated carrier particles for use with toner particles in two-component developer compositions.

Illustrative examples of carrier particles that can be selected in accordance with the present invention include those particles that are capable of triboelectrically obtaining a charge of opposite polarity to that of toner particles. Illustrative examples of suitable carrier particles include granular zircon, granular silicon, glass, steel, nickel, ferrites, iron ferrites, silicon dioxide, and the like. Additionally, there can be selected as carrier particles nickel berry carriers as disclosed in U.S. Pat. No. 3,847,604, the entire disclosure of which is hereby totally incorporated herein by reference, comprised of nodular carrier beads of nickel, characterized by surfaces of reoccurring recesses and protrusions thereby providing particles with a relatively large external area. Other carriers are disclosed in U.S. Pat. Nos. 4,937,166 and 4,935,326, the disclosures of which are hereby totally incorporated herein by reference.

In a most preferred embodiment, the carrier core is comprised of steel, preferably atomized steel. The carrier particles preferably have an average particle size (diameter) of from, for example, about 50 to about 110 microns. The carrier particles may be of the type described in co-pending application No. 09/520,439, U.S. Pat. No. 6,365,316 entitled "Toner And Developer Providing Offset Lithography Print Quality," filed Mar. 7, 2000, incorporated herein by reference in its entirety.

The carrier core particles are preferably partially coated with a coating containing at least the PMMA polymer particles prepared by the surfactant-free, semi-continuous emulsion polymerization process described above. The PMMA is an electropositive polymer in that the polymer will generally impart a negative charge on the toner with which it is contacted.

Optionally, the carrier coating composition may also contain another dry polymer not in close proximity to the dry PMMA polymer particles in the triboelectric series. Such electronegative polymer, i.e., the polymer that will generally impart a positive charge on the toner which it is contacted with, is preferably comprised of a polyvinylidenefluoride polymer or copolymer. Such polyvinylidenefluoride polymers are commercially available, for example under the tradename Kynar from Pennwalt. Kynar 301F is polyvinylidenefluoride and Kynar 7201 is copolyvinylidenefluoride tetrafluoroethylene. This polymer may be contained in an amount of from 0% to 80% by weight of the weight of the dry polymers comprising the carrier coating composition.

The coated carrier particles may be prepared by mixing the carrier core with from, for example, between about 0.05 to about 10 percent by weight, more preferably between about 0.05 percent and about 3 percent by weight, based on the weight of the coated carrier particles, of the coating composition for a time until adherence thereof to the carrier core by mechanical impaction and/or electrostatic attraction.

The polymers of the coating composition are most preferably applied in dry powder form. Various effective suitable means can be used to apply the polymer to the surface of the carrier core particles. Examples of typical means for this purpose include combining the carrier core and the dry polymer particles of the coating by cascade roll mixing, or tumbling, milling, shaking, electrostatic powder cloud spraying, fluidized bed, electrostatic disc processing, and with an electrostatic curtain.

The mixture of carrier core particles and polymer is then heated to a temperature below the decomposition temperature of the polymer coating. For example, the mixture is heated to a temperature of from about 150° C. to about 260° C., for a period of time of from, for example, about 10 minutes to about 60 minutes, enabling the polymers to melt and fuse to the carrier core particles. The coated carrier particles are then cooled and thereafter classified to a desired particle size. The coating preferably has a coating weight of from, for example, 0.1 to 3.0% by weight of the carrier, preferably 0.5 to 1.3% by weight.

The coated carriers are used in forming developers for use in xerographic printing machines. Two-component developer compositions of the present invention can be generated by admixing the coated carrier core particles with a toner composition comprised of binder resin and pigment/dye.

The following examples illustrate specific embodiments of the present invention. All parts and percentages are by weight unless otherwise indicated.

EXAMPLES

In a 1 L glass reactor, 330 g deionized water (DIW) is stirred at 150 rpm, and is heated to 80° C. A solution of 1 g ammonium persulfate initiator in 20 g DIW is added to the water and stirred for 10 minutes. A mixture of 150 g methyl methacrylate (MMA) and 1.5 g divinylbenzene (DVB) (crosslinking agent) is pumped into the hot aqueous phase at a rate of between 0.5 g/minute and 1.5 g/minute. After all of the MMA/DVB is added to the aqueous phase, the mixture is stirred for an additional 2 hours to complete the reaction.

A small sample of the mixture is submitted for gas chromatography and particle size analysis, and the rest is dried without further processing.

The above procedure is repeated using various amounts of DVB, and the results are summarized in Table 1 (in Table 1, n.d. indicates not determined).

TABLE 1

| | | Wet Sample Analysis | | | Dry Sample Analysis | | | |
|---|---|---|---|---|---|---|---|---|
| | | GC | Particle Size | | Particle Size | | | |
| Example | Mass DVB (g) | wt % MMA | Vol. Median Size (μm) | Num. Median Size (μm) | Vol. Median Size (μm) | Num. Median Size (μm) | Tg onset (° C.) | Notes |
| 1 | 0 | 0.16 | 0.483 | 0.442 | 0.860 | 0.500 | 111.9 | Vacuum Dried |
| 2 | 0.74 | n.d. | 0.574 | 0.532 | 0.487 | 0.446 | 114.0 | Freeze Dried |
| 3 | 1.11 | n.d. | 0.472 | 0.413 | 0.439 | 0.399 | 115.4 | Freeze Dried |
| 4 | 1.50 | 0.15 | 0.419 | 0.345 | 0.419 | 0.345 | 114.0 | Freeze Dried |

The above PMMA materials are coated onto carrier beads, and compared to carrier beads coated with a PMMA commercially available as Soken PMMA MP-116, made by unknown methods (Comparative Example). The carrier beads are coated with the PMMA materials alone, as well as coated with the PMMA materials in mixture with various amounts of Kynar (a commercially available polyvinylidene fluoride).

The carriers are processed in 5" kiln inserts, and consist of Nuclear Metals 100 μm diameter core and 1% coating weight of PMMA or PMMA/Kynar. The core and polymers are mixed in an M5R blender (30 min. @ 50 rpm, 10 lb. loading) and fused (30 min. residence time) at 400° F. The tribo values of the coated cores are then measured by the known Faraday Cage method. The results are summarized in Table 2.

TABLE 2

| PMMA ID | wt % PMMA/ wt % KYNAR | Tribo (μC/g) | % TC (%)* |
|---|---|---|---|
| Comparative Example | 100/0 | 18.87 | 3.58 |
| | 80/20 | 14.70 | 3.78 |
| | 60/40 | 10.14 | 3.47 |
| | 40/60 | -2.41 | 3.32 |
| | 20/80 | -11.95 | 3.63 |
| Example 1 | 100/0 | 22.69 | 3.39 |

TABLE 2-continued

| PMMA ID | wt % PMMA/ wt % KYNAR | Tribo (μC/g) | % TC (%)* |
|---|---|---|---|
| | 80/20 | 7.05 | 3.30 |
| | 60/40 | -0.82 | 3.52 |
| | 40/60 | -9.35 | 3.67 |
| | 20/80 | -14.19 | 3.63 |
| Example 2 | 100/0 | 20.18 | 3.43 |
| | 80/20 | 12.99 | 3.53 |
| | 60/40 | 8.20 | 3.38 |
| | 40/60 | -2.37 | 3.60 |
| | 20/80 | -11.84 | 3.58 |
| Example 3 | 100/0 | 20.46 | 3.50 |
| | 80/20 | 13.56 | 3.58 |
| | 60/40 | 6.52 | 3.37 |
| | 40/60 | -1.56 | 3.48 |
| | 20/80 | -11.99 | 3.61 |
| Example 4 | 100/0 | 20.06 | 3.54 |
| | 80/20 | 12.80 | 3.54 |
| | 60/40 | 7.18 | 3.38 |
| | 40/60 | 0.13 | 3.44 |
| | 20/80 | -11.33 | 3.56 |

* %TC is weight percent of toner in the carrier/toner mixture. It is determined gravimetrically by weighing the toner that is blown off the carrier during the tribo measurement and back calculating.

The results indicate that the method of the present invention is able to efficiently prepare submicron sized PMMA particles that compare favorably to commercially available PMMA particles. However, in view of the lower tribo exhibited by the particles of Example 1 (containing no DVB comonomer), it is apparent that the PMMA particles prepared by the emulsion polymerization process of the present invention are most preferably crosslinked by addition of a crosslinking agent such as DVB.

What is claimed is:

1. A process for preparing submicron sized particles comprised of poly(methyl methacrylate), comprising:
   (i) preparing an aqueous phase containing a free radical initiator in water by heating and stirring;
   (ii) preparing a monomer composition comprising at least 80% by weight methyl methacrylate and wherein the monomer composition further contains 1 to 10% by weight of a crosslinking agent;
   (iii) adding the monomer composition to the aqueous phase to initiate emulsion polymerization of the monomer composition, the adding being done at a rate such that from 0.05% to 5% by weight of the total weight of the monomer composition is added per minute;
   (iv) continuing heating and stirring following completion of the adding of the monomer composition to continue polymerizing the monomer composition; and (v) drying and recovering the submicron sized particles comprised of poly(methyl methacrylate), wherein the process is conducted in the absence of any surfactants.

2. The process according to claim 1, wherein the aqueous phase containing the free radical initiator is prepared by heating the water to a temperature below the boiling point of the water while stirring, and then adding a solution of the initiator in water to the water.

3. The process according to claim 2, wherein the water is deionized water.

4. The process according to claim 1, wherein the free radical initiator is present in the aqueous phase in an amount of from 0.1% to 10% by weight of a total amount of methyl methacrylate to be added.

5. The process according to claim 1, wherein the free radical initiator is ammonium persulfate.

6. The process according to claim 1, wherein the monomer composition contains at least 90% by weight methyl methacrylate monomer.

7. The process according to claim 1, wherein the crosslinking agent is divinylbenzene.

8. The process according to claim 1, wherein the heating and stirring is continued following completion of the adding of the monomer composition for from 30 minutes to 4 hours.

9. A process for preparing a coated carrier particle for a two-component developer, comprising (a) preparing submicron sized particles comprised of poly(methyl methacrylate) by:
   (i) preparing an aqueous phase containing a free radical initiator in water by heating and stirring;
   (ii) preparing a monomer composition comprising at least 80% by weight methyl methacrylate and wherein the monomer composition further contains 1 to 10% by weight of a crosslinking agent;
   (iii) adding the monomer composition to the aqueous phase to initiate emulsion polymerization of the monomer composition, the adding being done at a rate such that from 0.05% to 5% by weight of the total weight of the monomer composition is added per minute;
   (iv) continuing heating and stirring following completion of the adding of the monomer composition to continue polymerizing the monomer composition; and
   (v) drying and recovering the submicron sized particles comprised of poly(methyl methacrylate),
   wherein the preparing of the submicron sized particles comprised of poly(methyl methacrylate) is conducted in the absence of any surfactants;

(b) following preparation of the submicron sized particles comprised of poly(methyl methacrylate):
   (i) mixing a carrier core with a coating composition comprising the submicron sized particles comprised of poly(methyl methacrylate) for a time until the coating composition adheres to the carrier core; and
   (ii) heating the mixture for a time sufficient to melt and fuse the coating composition to the carrier core, thereby obtaining the coated carrier particle.

10. The process according to claim 9, wherein the mixing is by cascade roll mixing, tumbling, milling, shaking, electrostatic powder cloud spraying, fluidized bed, electrostatic disc processing or with an electrostatic curtain.

11. The process according to claim 9, wherein the coating composition further comprises 0% to 80% by weight of a polyvinylidenefluoride polymer or copolymer.

12. The process according to claim 9, wherein the carrier core is comprised of steel having an average particle diameter of from 50 to 110 microns.

13. The process according to claim 9, wherein the coated carrier particle is coated with the coating composition such that the coating has a coating weight of from 0.1% to 3.0% by weight of the carrier.

14. The process according to claim 9, wherein the mixture is heated to a temperature of from 150° C. to 260° C. for a period of time of from 10 minutes to 60 minutes.

15. The process according to claim 9, wherein the monomer composition contains at least 90% by weight methyl methacrylate monomer.

16. The process according to claim 9, wherein the crosslinking agent is divinylbenzene.

* * * * *